(12) United States Patent
Lin

(10) Patent No.: US 9,310,202 B2
(45) Date of Patent: Apr. 12, 2016

(54) ANGULAR RATE SENSOR WITH QUADRATURE ERROR COMPENSATION

(75) Inventor: Yizhen Lin, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 841 days.

(21) Appl. No.: 13/544,181

(22) Filed: Jul. 9, 2012

(65) Prior Publication Data

US 2014/0007681 A1 Jan. 9, 2014

(51) Int. Cl.
*G01C 19/00* (2013.01)
*G01C 19/5719* (2012.01)
*G01C 19/5733* (2012.01)

(52) U.S. Cl.
CPC ........ *G01C 19/5719* (2013.01); *G01C 19/5733* (2013.01)

(58) Field of Classification Search
CPC ........... G01C 19/5719; G01C 19/5733; G01C 19/5747; G01P 9/02; Y10T 29/49002
See application file for complete search history.

(56) References Cited

U.S. PATENT DOCUMENTS

| | | | | |
|---|---|---|---|---|
| 3,757,773 A * | 9/1973 | Kolin | ...................... | A61B 5/027 600/505 |
| 4,511,848 A | 4/1985 | Watson | | |
| 4,981,359 A * | 1/1991 | Tazartes | .................. | G01C 19/70 356/459 |
| 5,992,233 A * | 11/1999 | Clark | .................. | G01C 19/5719 361/280 |
| 6,067,858 A | 5/2000 | Clark et al. | | |
| 6,230,563 B1 | 5/2001 | Clark et al. | | |
| 6,250,156 B1 * | 6/2001 | Seshia | ................ | G01C 19/5719 73/504.12 |
| 6,360,601 B1 * | 3/2002 | Challoner | .......... | G01C 19/5719 73/504.12 |
| 6,370,937 B2 * | 4/2002 | Hsu | ..................... | G01C 19/5719 73/1.37 |
| 6,481,285 B1 * | 11/2002 | Shkel | ................. | G01C 19/5719 73/504.13 |
| 6,675,630 B2 * | 1/2004 | Challoner | .......... | G01C 19/5719 73/1.77 |
| 7,036,373 B2 * | 5/2006 | Johnson | ............. | G01C 19/5719 73/504.02 |
| 7,444,868 B2 * | 11/2008 | Johnson | ............. | G01C 19/5719 73/504.12 |
| 7,481,110 B2 | 1/2009 | Handrich et al. | | |
| 7,971,483 B2 * | 7/2011 | Supino | ............... | G01C 19/5719 73/504.04 |
| 7,984,648 B2 * | 7/2011 | Horning | ............. | G01C 19/5719 73/504.04 |
| 8,037,757 B2 * | 10/2011 | Johnson | ............. | G01C 19/5719 73/504.12 |
| 8,187,902 B2 * | 5/2012 | Weinberg | ........... | G01C 19/5719 438/50 |

(Continued)

FOREIGN PATENT DOCUMENTS

EP 1359391 A2 11/2003

OTHER PUBLICATIONS

EP 2685211 A1 (Application No. 13173286.9) European Search Opinion, pp. 1-4.*

*Primary Examiner* — Laura Martin
*Assistant Examiner* — Samir M Shah
(74) *Attorney, Agent, or Firm* — Charlene R. Jacobsen

(57) ABSTRACT

An angular rate sensor (20) includes a drive mass (36) flexibly coupled to a substrate (22). A sense mass (42) is suspended above the substrate (22) is and flexibly connected to the drive mass (36) via flexible support elements (44). A quadrature compensation electrode (24) is associated with the drive mass (36) and a sense electrode (28) is associated with the sense mass (42). The drive mass (36) and the sense mass (42) oscillate together relative to a sense axis (50) in response to quadrature error. The quadrature error produces a signal error component (78) between the quadrature compensation electrode (24) and the drive mass (36) and a signal error component (76) between the sense electrode (28) and the sense mass (42). The compensation and sense electrodes (24, 28) are coupled in reverse polarity so that the signal error component (78) substantially cancels the signal error component (76).

8 Claims, 4 Drawing Sheets

(56) References Cited

U.S. PATENT DOCUMENTS

| | | | | |
|---|---|---|---|---|
| 8,230,740 B2* | 7/2012 | Katsuki | G01C 19/5719 | 73/504.12 |
| 8,263,426 B2* | 9/2012 | Ko | G01H 11/06 | 257/415 |
| 8,695,425 B2* | 4/2014 | Classen | G01C 19/5747 | 73/504.12 |
| 9,052,194 B2* | 6/2015 | Seeger | G01C 19/5719 | |
| 2001/0039834 A1* | 11/2001 | Hsu | G01C 19/5719 | 73/504.02 |
| 2002/0020219 A1* | 2/2002 | DeRoo | G01C 19/5719 | 73/504.12 |
| 2003/0033850 A1* | 2/2003 | Challoner | G01C 19/56 | 73/1.77 |
| 2003/0084722 A1* | 5/2003 | Kim | G01C 19/5762 | 73/504.08 |
| 2003/0200804 A1* | 10/2003 | Johnson | G01C 19/56 | 73/504.12 |
| 2005/0284222 A1* | 12/2005 | Johnson | G01C 19/5719 | 73/504.02 |
| 2008/0282833 A1 | 11/2008 | Chaumet | | |
| 2011/0041609 A1 | 2/2011 | Clark et al. | | |
| 2014/0374849 A1* | 12/2014 | Lin | G01C 19/5712 | 257/415 |

* cited by examiner

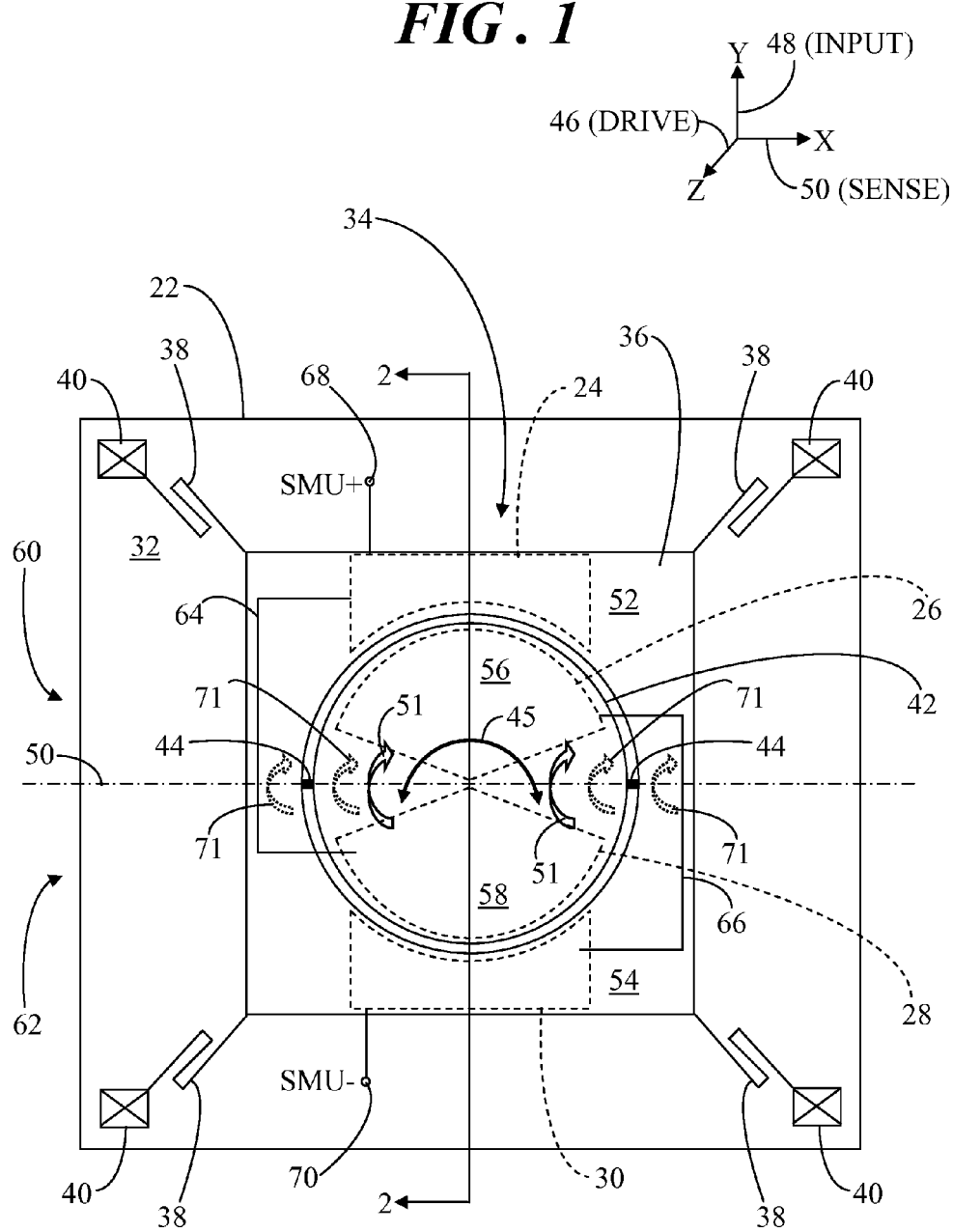

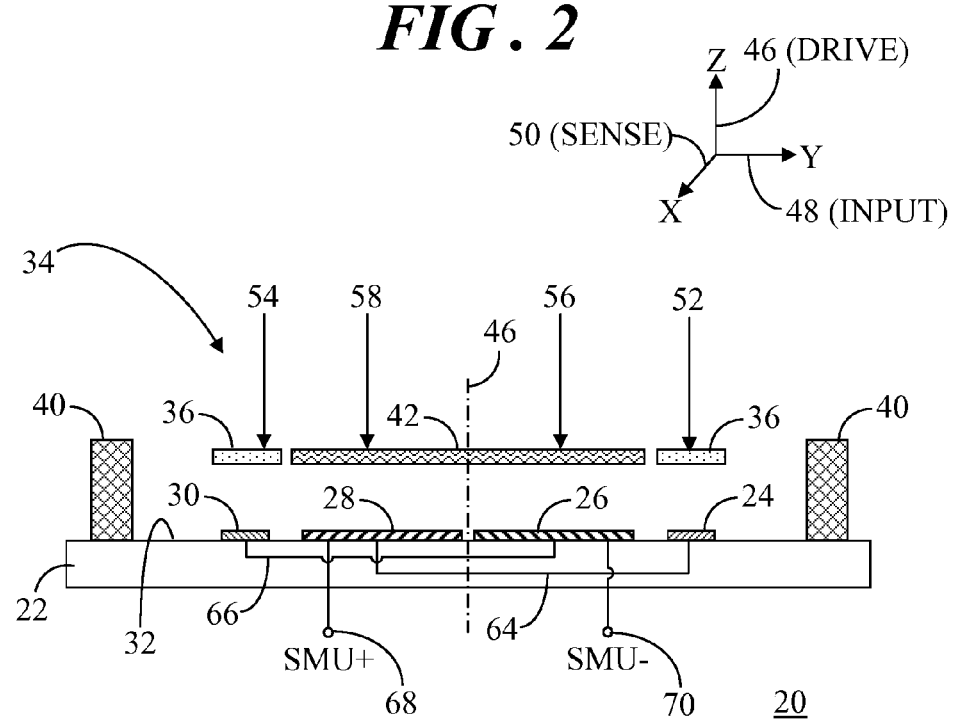

ANGULAR RATE SENSOR WITH QUADRATURE ERROR COMPENSATION

TECHNICAL FIELD OF THE INVENTION

The present invention relates generally to microelectromechanical systems (MEMS) devices. More specifically, the present invention relates to a MEMS angular rate sensor with compensation for quadrature error.

BACKGROUND OF THE INVENTION

Microelectromechanical systems (MEMS) technology has achieved wide popularity in recent years, as it provides a way to make very small mechanical structures and integrate these structures with electrical devices on a single substrate using conventional batch semiconductor processing techniques. One common application of MEMS is the design and manufacture of sensor devices. MEMS sensors are widely used in applications such as automotive, inertial guidance systems, household appliances, game devices, protection systems for a variety of devices, and many other industrial, scientific, and engineering systems. One example of a MEMS sensor is a MEMS angular rate sensor. Alternatively referred to as a "gyroscope", "gyrometer," "vibratory rate gyroscopes," "gyroscope sensor," or "yaw rate sensor," an angular rate sensor senses angular speed or velocity around one or more axes.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1 shows a top view diagram of an angular rate sensor in accordance with an embodiment;

FIG. 2 shows a side view diagram of the angular rate sensor along section line 2-2 in FIG. 1;

FIG. 3 shows a table of equations representing the quadrature compensation feature of the angular rate sensor of FIG. 1;

DETAILED DESCRIPTION

Figure 4:
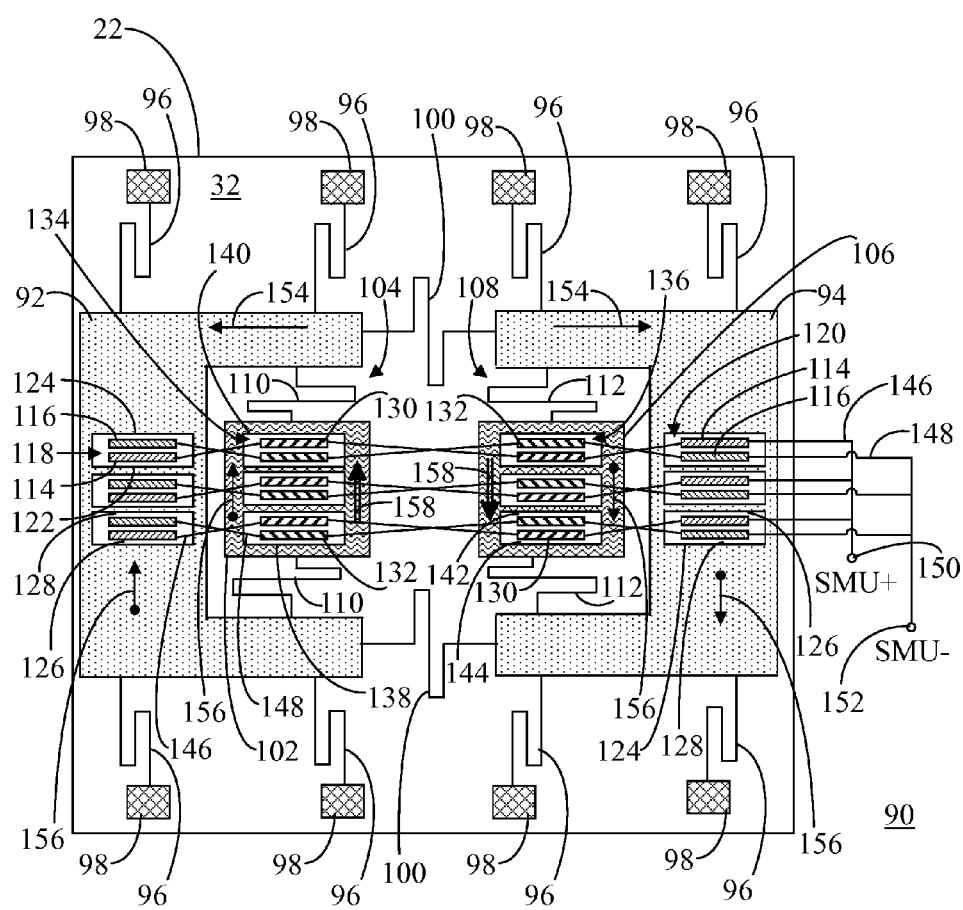
FIG. 4 shows a top view diagram of an angular rate sensor in accordance with another embodiment.

In vibratory angular rate sensors, an inherent problem is the existence of undesirable interference signals, referred to as a quadrature component or quadrature error. Quadrature error occurs in vibrating angular rate sensors due to manufacturing imperfections that permit the sense mass to oscillate about an axis that is not orthogonal to the sense axis. This creates an oscillation about the sense axis that can be confused with Coriolis acceleration and subsequently, the rotation rate. Unfortunately, quadrature error can result in offset error, reduced dynamic range, and increased noise for the device. A large quadrature error can even cause a device to rail so that the sense mass comes into contact with conductive electrodes potentially resulting in collision-related damage, such as a short.

In some prior art devices, an electrostatic force may be applied via quadrature compensation electrodes in opposite phase relation to the quadrature error in order to compensate for, or otherwise null, the quadrature signal. While application of an electrostatic force can suppress mechanical motion caused by quadrature error, this technique requires relatively large voltage, large allocated area for quadrature compensation electrodes, and/or precise phase matching between the quadrature error and the electrostatic compensation force. In other prior art devices, a cancellation signal may be applied onto the front end of the application-specific integrated circuit (ASIC) to null out the quadrature signal. Such a technique can cancel large quadrature error without application of an electrostatic force. However, mechanical quadrature motion still exists, and a precise match must be made between the quadrature error signal and the cancellation signal in order to effectively null the quadrature error.

Embodiments disclosed herein entail microelectromechanical systems (MEMS) devices in the form of angular rate sensors in which a quadrature compensation technique is implemented. It has been determined that when an angular rate sensor experiences quadrature motion, both the drive mass and the sense mass move together in response to this quadrature motion. In accordance with embodiments disclosed herein, quadrature compensation electrodes are added in association with the drive mass. The quadrature compensation electrodes are coupled in reverse polarity with the sense electrodes. By coupling the quadrature compensation electrodes in reverse polarity with the sense electrodes, the capacitance output due to quadrature error will be significantly reduced, thus compensating for the quadrature error. Consequently, compensation for quadrature error is accomplished without using electrostatic force.

Referring to FIGS. 1 and 2, FIG. 1 shows a top view diagram of a MEMS angular rate sensor 20 in accordance with an embodiment, and FIG. 2 shows a side view diagram of angular rate sensor 20 along section line 2-2 in FIG. 1. FIG. 2 is illustrated using various shading and/or hatching to more clearly distinguish different elements produced within the structural layers of angular rate sensor 20. The different elements within the structural layers of angular rate sensor 20 may be produced utilizing current and upcoming surface micromachining techniques of depositing, patterning, etching, and so forth. Accordingly, although different shading and/or hatching is utilized in the illustrations, the different elements and interconnects within the structural layers are typically formed out of the same material, such as polysilicon, single crystal silicon, and the like.

The elements of angular rate sensor 20 (discussed below) may be described variously as being "attached to," "attached with," "coupled to," "fixed to," or "interconnected with," other elements of angular rate sensor 20. However, it should be understood that the terms refer to the direct or indirect physical connections of particular elements of MEMS angular rate sensor 20 that occur during their formation through patterning and etching processes of MEMS fabrication.

Angular rate sensor 20 includes a substrate 22, and conductive plates 24, 26, 28, and 30, i.e., electrodes, that may be fixedly mounted or otherwise formed on a surface 32 of substrate 22. A structure 34 is coupled to and suspended above surface 32 of substrate 22. Structure 34 overlies conductive plates 24, 26, 28, and 30 so that conductive plates 24, 26, 28, and 30 are disposed between structure 34 and surface 32 of substrate 22. Consequently, conductive plates 24, 26, 28, and 30 are obscured in the top view of sensor 20, and are thus represented in dashed line form in FIG. 1. Structure 34 includes a drive mass 36 flexibly attached with flexible support elements 38, e.g. springs, to surface 32 of substrate 22 via anchors 40. Structure 34 further includes a sense mass 42 residing in an opening extending through drive mass 36.

Sense mass 42 is attached to drive mass 36 with flexible support elements, i.e., torsion flexures 44.

To operate angular rate sensor 20, a drive system (not shown for simplicity of illustration) in communication with drive mass 36 enables mechanical oscillation, as represented by a bi-directional arrow 45, of drive mass 36 in a plane parallel to surface 32 of substrate 22 about a first axis of rotation, referred to herein as a drive axis 46. As such, drive axis is perpendicular to surface 32. In this example, the drive axis is a Z-axis 46 in a three-dimensional coordinate system. Thus, Z-axis 46 is referred to herein as a drive axis 46 in connection with angular rate sensor 20. Sense mass 42 oscillates about the drive axis 46 together with drive mass 36 due to the high stiffness of torsion flexures 44 to this motion. The oscillatory drive motion 45 may be kept constant to maintain constant sensitivity of angular rate sensor 20. Additionally or alternatively, the frequency of oscillation can be locked to the mechanical resonance of drive mass 36 to minimize drive power.

Once sense mass 42 is put into oscillatory motion 45 about drive axis 46, it is capable of detecting an angular rate, i.e., angular velocity, induced by angular rate sensor 20 being rotated about a second axis of rotation, referred to herein as an input axis. In this example, the input axis is the Y-axis 48 in a three-dimensional coordinate system. Thus, Y-axis 48 is referred to herein as an input axis 48 in connection with angular rate sensor 20. As angular rate sensor 20 experiences an angular velocity about input axis 48, sense mass 42 oscillates about a third axis of rotation, referred to herein as a sense axis. In this example, the sense axis is the X-axis 50 in a three-dimensional coordinate system. Thus, X-axis 50 is referred to herein as a sense axis 50 in connection with angular rate sensor 20. In particular, a Coriolis acceleration occurs about sense axis 50, which is perpendicular to both drive axis 46, and input axis 48. The Coriolis acceleration results in out-of-plane movement of sense mass 42 about sense axis 50, as represented by solid arrows 51, where the out-of-plane movement 51 has an amplitude that is proportional to the angular rotation rate of sensor 20 about input axis 48.

In an embodiment, sense axis 50 (i.e., the third axis of rotation), separates drive mass 36 into a first region 52 on one side of sense axis 50 and a second region 54 on the opposite side of sense axis 50. Likewise, sense axis 50 separates sense mass 42 into a third region 56 on one side of sense axis 50 and a fourth region 58 on the opposite side of sense axis 50. Thus, first and third regions 52 and 56, respectively, are laterally disposed on a first side 60 of sense axis 50 and second and fourth regions 54 and 58, respectively, are laterally disposed on a second side 62 of sense axis 50.

Substrate 22 can include a semiconductor layer (not shown) that is covered by one or more insulation layers (not shown). The semiconductor layer is typically a silicon wafer upon which electronics associated with angular rate sensor 20 may, in some cases, also be fabricated using conventional manufacturing technologies. The insulating layer may include glass, silicon dioxide, silicon nitride, or any other compatible material. Conductive plate 24 may be formed in the semiconductor layer underlying first region 52 of drive mass 36, and conductive plate 26 may be formed in the semiconductor layer underlying third region 56 of sense mass 42. Similarly, conductive plate 28 may be formed in the semiconductor layer underlying fourth region 58, and conductive plate 30 may be formed in the semiconductor layer underlying second region 54, respectively, of sense mass 42.

Conductive plates 24 and 30 are associated with drive mass 36 through their location underlying drive mass 36, and conductive plates 26 and 28 are associated with sense mass 42 through their location underlying sense mass 42. In accordance with a particular embodiment, conductive plates 26 and 28 are implemented as sense electrodes for sensing movement 51 of sense mass 42 about sense axis 50 due to Coriolis acceleration as described above. As such, conductive plate 26 is alternatively referred to herein as a first sense electrode 26 (and is illustrated using downwardly and rightwardly directed wide hatching) and conductive plate 28 is alternatively referred to herein as a second sense electrode 28 (and is illustrated using upwardly and rightwardly directed wide hatching). In addition, conductive plates 24 and 30 are implemented as quadrature compensation electrodes associated with drive mass 36, their purpose of which will be described in detail below. As such, conductive plate 24 is alternatively referred to herein as a first quadrature compensation electrode 24 (and is illustrated using upwardly and rightwardly directed narrow hatching) and conductive plate 30 is alternatively referred to herein as a second quadrature compensation electrode 30 (and is illustrated using downwardly and rightwardly directed narrow hatching). The terms "first," "second," and so forth used herein do not refer to an ordering or prioritization of elements within a countable series of elements. Rather, the terms "first," "second," and so forth are used herein to distinguish similar or related elements, such as sense electrodes 26 and 28, quadrature compensation electrodes 24 and 30, and so forth for clarity of discussion.

Conductors can be formed on substrate 22 to provide electrical connections to conductive plates 24, 26, 28, and 30 and to sense mass 42. In accordance with a particular embodiment, a first conductor 64 electrically couples first quadrature compensation electrode 24, disposed beneath first region 52 of drive mass 36 located at first side 60 of sense axis 50, with second sense electrode 28, disposed beneath fourth region 58 of sense mass 42 located at second side 62 of sense axis 50. In addition, a second conductor 66 electrically couples second quadrature compensation electrode 30, disposed beneath second region 54 of drive mass 36 located at second side 62 of sense axis 50, with first sense electrode 26, disposed beneath third region 56 of sense mass 42 located at first side 60 of sense axis 50.

In the illustrated embodiment, a positive output terminal 68 (labeled "SMU+") is coupled with second sense electrode 28 by way of first conductor 64 and first quadrature compensation electrode 24. Likewise, a negative output terminal 70 (labeled "SMU−") is coupled with first sense electrode 26 by way of second conductor 66 and second quadrature compensation electrode 30. Thus, second sense electrode 28 may be considered a positive sense pole of angular rate sensor 20, while first compensation electrode 24 may be considered a negative compensation pole of angular rate sensor 20. Similarly, first sense electrode 26 may be considered a negative sense pole of angular rate sensor 20, while second compensation electrode 30 may be considered a positive compensation pole of angular rate sensor 20.

First and second conductors 64 and 66, respectively, and positive and negative output terminals 68 and 70, respectively, are represented in diagrammatic form for illustrative purposes. Those skilled in the art will readily recognize that in practice first and second conductors 64 and 66 and terminals 68 and 70 will be suitably formed as traces and/or conductive pads on surface 32 of substrate 22 and/or formed in underlying layers of substrate 22, in accordance with current and upcoming manufacturing processes. In addition, electrodes 24, 26, 28, and 30 are formed from a conductive material such as polysilicon, and can be formed at the same time as the respective conductors if the same materials are chosen for such components. Furthermore, electrodes 24, 26, 28, and 30 as well as conductors 64 and 66, and terminals 68 and 70 are described as being attached to or otherwise formed on surface 32 of substrate 22. In alternative embodiments, electrodes 24, 26, 28, and 30 may be fixedly attached at their respective first, second, third, and fourth regions 52, 54, 56, and 58 on drive mass 36 or sense mass 42 with conductors 64 and 66 and terminals 68 and 70 being in electrical communication with electrodes 24, 26, 28, and 30 as described above. Such a configuration may or may not include additional electrodes or conductive regions (not shown) formed on surface 32 of substrate 22.

The electrical coupling of first quadrature compensation electrode 24 with second sense electrode 28 and their respective locations on opposing sides of sense axis 50 results in electrodes 24 and 28 being electrically coupled in reverse polarity. Likewise, the electrical coupling of second quadrature compensation electrode 30 with first sense electrode 26 and their respective locations on opposing sides of sense axis 50 also results in electrodes 26 and 30 being electrically coupled in reverse polarity.

In general, as sense mass 42 undergoes the oscillatory out-of-plane motion about sense axis 50, the position change is sensed as changes in capacitance by first and second sense electrodes 26 and 28. The change in capacitance sensed at first and second electrodes 26 and 28 is processed electronically in the conventional manner to obtain the angular rate of angular rate sensor 20 about input axis 48. However, it should be recalled that drive mass 36 and sense mass 42 oscillate together about sense axis 50 in response to quadrature error. The motion of both drive mass 36 and sense mass 42 due to quadrature error is represented by arrows 71. This quadrature error produces signal error components at each of first and second quadrature compensation electrodes 24 and 30, as well as at each of first and second sense electrodes 26 and 28. The reverse polarity coupling of first quadrature compensation electrode 24 with second sense electrode 28, and the reverse polarity coupling of second quadrature compensation electrode 30 with first sense electrode 26 results in the cancellation of the respective error components.

Referring to FIG. 3 in connection with FIGS. 1 and 2, FIG. 3 shows a table of equations representing the quadrature compensation feature of the angular rate sensor of FIG. 1. An output signal 72, e.g., a capacitance, at positive output terminal 68 (SMU+) is a function of a Coriolis Response 74, labeled "CR(2)" plus a quadrature error component 76, labeled "QE(2)" at second sense electrode 28, subtracted by a quadrature error component 78, labeled "QE(1)" at first quadrature compensation electrode 24. In addition, an output signal 80, e.g., a capacitance, at negative output terminal 70 (SMU−) is a function of a Coriolis Response 82, labeled "CR(1)" plus a quadrature error component 84, labeled "QE (4)" at first sense electrode 26, subtracted by a quadrature error component 86, labeled "QE(3)" at second quadrature compensation electrode 30.

Through the reverse polarity electrical coupling of first quadrature compensation electrode 24 with second sense electrode 28, quadrature error component 78 at first quadrature compensation electrode 24 substantially cancels quadrature error component 76 at second sense electrode 28. Additionally, through the reverse polarity coupling of second quadrature compensation electrode 30 with first sense electrode 26, quadrature error component 86 at second quadrature compensation electrode 30 substantially cancels quadrature error component 84 at first sense electrode 26. Thus, quadrature error at first and second sense electrodes 26 and 28 can be substantially cancelled without using more power intensive and complex electrostatic force techniques and/or without application of a cancellation signal.

Angular rate sensor 20 is provided with only two pairs of conductive plates (e.g., quadrature compensation electrodes 24 and 30 and sense electrodes 26 and 28) for simplicity of illustration. It should be understood, however, that in alternative embodiments, additional electrode shapes, sizes, and types may be implemented for a particular design, provided that quadrature compensation electrodes associated with a drive mass are electrically coupled in reverse polarity with the sense electrodes. In addition, angular rate sensor 20 includes a generally rectangular drive mass and a circular sense mass. However, in alternative embodiments, the drive mass and/or sense mass can have different shapes, such as circular rings, disks, and the like.

Figure 5:
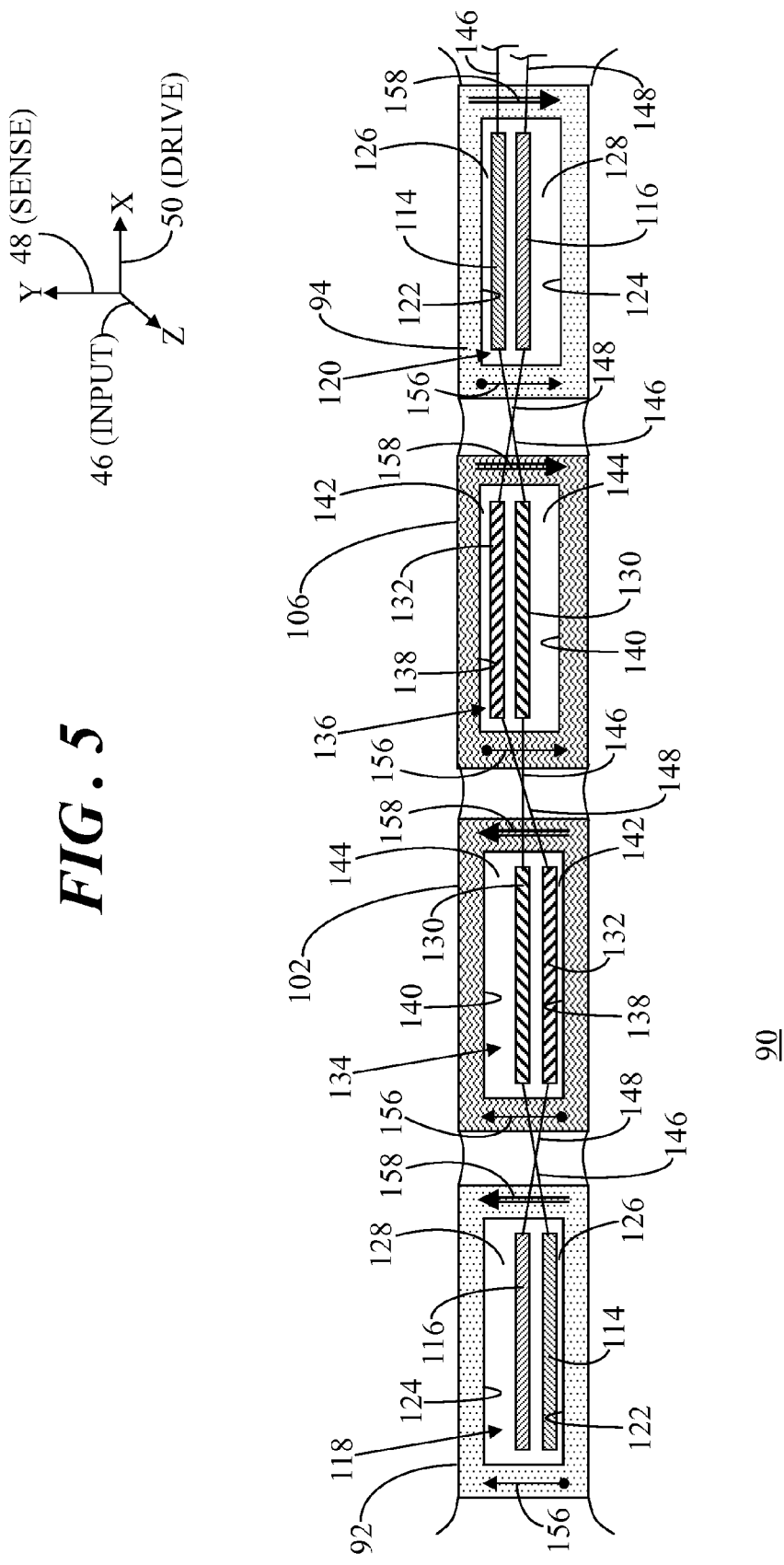
FIG. 5 shows an enlarged view of a portion of the angular rate sensor of FIG. 4.

Referring to FIGS. 4 and 5, FIG. 4 shows a top view diagram of an angular rate sensor 90 in accordance with another embodiment, and FIG. 5 shows an enlarged view of a portion of angular rate sensor 90. Angular rate sensor 90 exemplifies the quadrature compensation technique in a single axis sensor configured to sense angular rate about Z-axis 46. Thus, Z-axis 46 is referred to in connection with angular rate sensor 90 as an input axis 46. Various elements of angular rate sensor 90 are illustrated with shading or hatching in order to better distinguish them from one another. In accordance with conventional manufacturing techniques, the various elements may be formed concurrently through deposition, patterning, and etching processes, and thus are likely to be manufactured from the same material such as polysilicon.

Angular rate sensor 90 includes a split drive mass system, in the form of a first drive mass 92 and a second drive mass 94 laterally disposed from first drive mass 92. First and second drive masses 92 and 94 are flexibly attached with flexible support elements 96, e.g. springs, via anchors 98 so that they are suspended above surface 32 of substrate 22. Additionally, first and second drive masses 92 and 94 are coupled to one another via flexible elements 100. Angular rate sensor 90 further includes a first sense mass 102 residing in an opening 104, or notched section, extending through first drive mass 92 and a second sense mass 106 residing in an opening 108, or notched section, extending through second drive mass 94. First sense mass 102 is suspended above surface 32 of substrate 22 and is connected to first drive mass 92 with flexible support elements 110. Second sense mass 106 is suspended above surface 32 of substrate 22 and is connected to second drive mass 94 with flexible support elements 112.

Multiple first quadrature compensation electrodes 114 (illustrated using rightwardly and upwardly directed narrow hatching) are fixedly attached to substrate 22 and are associated with each of first and second drive masses 92 and 94. Second quadrature compensation electrodes 116 (illustrated using rightwardly and downwardly directed narrow hatching) are also fixedly attached to substrate 22 and are associated with each of first and second drive masses 92 and 94. A pair of first and second compensation electrodes 114 and 116 resides in each of multiple openings 118 extending through first drive mass 92, and a pair of first and second compensation electrodes 114 and 116 resides in each of multiple openings 120 extending through second drive mass 94.

As more clearly visualized in FIG. 5, each of openings 118 and 120 includes a first drive mass edge 122 and a second drive mass edge 124 located on opposing longitudinal sides of openings 118 and 120. In each of openings 118 and 120, first compensation electrode 114 is laterally disposed away from first drive mass edge 122 to form a gap 126 between electrode 114 and first drive mass edge 122. Additionally, in each of openings 118 and 120, second compensation electrode 116 is laterally disposed away from second drive mass edge 124 to form a gap 128 between electrode 116 and second drive mass edge 124. A lengthwise dimension of first and second quadrature compensation electrodes 114 and 116, as well as openings 118 and 120, is longitudinally aligned with, i.e., parallel to, the drive axis, which in this embodiment is X-axis 50. Thus, X-axis 50 is referred to in connection with angular rate sensor 90 as drive axis 50. It should be observed that openings 120, including their quadrature compensation electrodes 114 and 116, exhibit flipped symmetry relative to openings 118, including their quadrature compensation electrodes 114 and 116. As such, in the illustrated orientation of FIG. 4, first drive mass edge 122 for each of openings 118 is below its corresponding second drive mass edge 124, whereas first drive mass edge 122 for each of openings 120 is above its corresponding second drive mass edge 124. Likewise, quadrature compensation electrodes 114 and 116 are in flipped relation in openings 120 relative to their positions in openings 118.

First sense electrodes 130 (illustrated using rightwardly and upwardly directed wide hatching) are fixedly attached to substrate 22 and are associated with each of first and second sense masses 102 and 106. Second sense electrodes 132 (illustrated using rightwardly and downwardly direct wide hatching) are also fixedly attached to substrate 22 and are associated with each of first and second sense masses 102 and 106. A pair of first and second sense electrodes 130 and 132 resides in each of multiple openings 134 extending through first sense mass 102, and a pair of first and second sense electrodes 130 and 132 resides in each of multiple openings 136 extending through second sense mass 106.

A more clearly visualized in FIG. 5, each of openings 134 and 136 includes a first sense mass edge 138 and a second sense mass edge 140 located on opposing longitudinal sides of openings 134 and 136. In each of openings 134 and 136, first sense electrode 130 is laterally disposed away from second sense mass edge 140 to form a gap 144 between electrode 130 and second sense mass edge 140. Additionally, in each of openings 134 and 136, second sense electrode 132 is laterally disposed away from first sense mass edge 138 to form a gap 142 between electrode 132 and first sense mass edge 138. A lengthwise dimension of first and second sense electrodes 130 and 132, as well as openings 134 and 136, is longitudinally aligned with, i.e., parallel to, drive axis 50. It should be observed that openings 136, including their first and second sense electrodes 130 and 132, exhibit flipped symmetry relative to openings 134, including their first and second sense electrodes 130 and 132. As such, in the illustrated orientation of FIGS. 4 and 5, second sense mass edge 140 for each of openings 134 is above its corresponding first sense mass edge 138, whereas second sense mass edge 140 for each of openings 136 is below its corresponding first sense mass edge 138. Likewise, sense electrodes 130 and 132 are in flipped relation in openings 136 relative to their positions in openings 134.

Conductors can be formed on substrate 22 to provide the reverse polarity electrical connections. In accordance with a particular embodiment, first conductors 146 electrically couple first quadrature compensation electrodes 114, disposed beside first drive mass edge 122 of openings 118 and 120 in each of first and second drive masses 92 and 94, with first sense electrodes 130, disposed beside second sense mass edge 140 of openings 134 and 136. In addition, second conductors 148 electrically couple second quadrature compensation electrode 116, disposed beside second drive mass edge 124 of openings 118 and 120 in each of first and second drive masses 92 and 94, with second sense electrodes 132 disposed beside first sense mass edge 138 of openings 134 and 136.

In the illustrated embodiment, a positive output terminal 150 (labeled "SMU+") is coupled with first sense electrodes 130 and first quadrature compensation electrodes 114 by way of first conductors 146. Likewise, a negative output terminal 152 (labeled "SMU−") is coupled with second sense electrodes 132 and second quadrature compensation electrodes 116 by way of second conductors 148. Thus, first sense electrodes 130 may be considered a positive sense pole of angular rate sensor 90, with first quadrature compensation electrodes 114 being a negative compensation pole of angular rate sensor 90. In addition, second sense electrodes 132 may be considered a negative sense pole of angular rate sensor 90, with second quadrature compensation electrodes 116 being a positive compensation pole of angular rate sensor 90.

The electrical coupling of first quadrature compensation electrodes 114 with first sense electrodes 130 and their respective flipped locations results in electrodes 114 and 130 being electrically coupled in reverse polarity. Likewise, the electrical coupling of second quadrature compensation electrodes 116 with second sense electrodes 132 and their respective flipped locations also results in electrodes 116 and 132 being electrically coupled in reverse polarity.

To operate angular rate sensor 90, a drive system (not shown for simplicity of illustration) in communication with first and second drive masses 92 and 94, enables mechanical linear oscillation of drive masses 92 and 94, as represented by oppositely pointing arrows 154, within a plane parallel to surface 32 of substrate 22. Thus, first and second drive masses 92 and 94 linearly oscillate along drive axis 50. First and second drive masses 92 and 94 are suitably linked together and/or otherwise suitably driven to move in opposite directions, i.e., antiphase, along drive axis 50. First sense mass 102 linearly oscillates along drive axis 50 together with first drive mass 92 due to the high stiffness of flexible support elements 110 to this motion. Likewise, second sense mass 106 linearly oscillates along drive axis 50 together with second drive mass 94 due to the high stiffness of flexible support elements 112 to this motion. Thus, first and second drive masses 92 and 94 move in opposite directions relative to one another, i.e., antiphase, along drive axis 50.

Once first and second sense masses 102 and 106 are put into linear oscillatory motion along drive axis 50, angular rate sensor 90 is capable of detecting an angular rate, i.e., angular velocity, induced by angular rate sensor 90 being rotated about an axis of rotation, referred to herein as an input axis. In this example, the input axis is Z-axis 46 perpendicular to surface 32 of substrate 22. Thus, Z-axis 46 is referred to in connection with angular rate sensor 90 as an input axis 46. As angular rate sensor 90 experiences an angular velocity about input axis 46, first and second sense masses 102 and 106 are put into linear oscillatory motion along a third axis, referred to herein as the sense axis. In this example, the sense axis is Y-axis 48. Therefore, Y-axis 48 is referred to in connection with angular rate sensor 90 as a sense axis 48. In particular, a Coriolis acceleration occurs along sense axis 48, which is perpendicular to both drive axis 50 and input axis 46. The Coriolis acceleration results in substantially linear movement, as represented by arrows 156, of first and second sense masses 102 and 106 along sense axis 48, where movement 156 has an amplitude that is proportional to the angular rotation rate of sensor 90 about input axis 46.

It should be readily observed in FIG. 5 that when first drive mass 92 and first sense mass 102 oscillate in a first direction along sense axis 48, e.g., upward relative to the illustration, a width of gap 126 between first quadrature compensation electrode 114 and first drive mass edge 122 decreases relative to a width of gap 144 between second sense mass edge 140 and first sense electrode 130. Concurrently, a width of gap 128 between second quadrature compensation electrode 116 and second drive mass edge 124 increases relative to a width of gap 142 between second sense mass edge 140 and first sense electrode 130. Of course, when first drive mass 92 and first sense mass 102 oscillate in a second direction opposing the first direction along sense axis 48, e.g., downward relative to the illustration, this relationship between the widths of gaps 126 and 144 and between gaps 128 and 142 is opposite to that described. Additionally, since second drive mass 94 and second sense mass 104 move in antiphase to first drive mass 92 and first sense mass 102, the position changes of second drive mass 94 and second sense mass 106 and the corresponding changes in widths of gaps will also be in antiphase.

Thus, as first and second sense masses 102 and 106 undergo the linear oscillatory motion along sense axis 48, the position change (i.e., changes in gap width) is sensed as changes in capacitance by first and second sense electrodes 130 and 132. The change in capacitance sensed at first and second electrodes 130 and 132 is processed electronically in the conventional manner to obtain the angular rate of angular rate sensor 90 about input axis 46.

It will be recalled that first drive mass 92 together with first sense mass 102 linearly oscillate along sense axis 48 in response to quadrature error. Likewise, second drive mass 94 together with second sense mass 106 also linearly oscillate along sense axis 48 in response to quadrature error. This motion of both drive masses 92 and 94 and sense masses 102 and 106 due to quadrature error is represented by oppositely pointing arrows 158. This quadrature error produces signal error components at each of first and second quadrature compensation electrodes 114 and 116, as well as at each of first and second sense electrodes 130 and 132. The reverse polarity coupling of first quadrature compensation electrodes 114 with first sense electrodes 130, and the reverse polarity coupling of second quadrature compensation electrodes 116 with second sense electrodes 132 results in cancellation of the respective error components.

Embodiments described herein comprise microelectromechanical systems (MEMS) devices in the form of angular rate sensors in which a quadrature compensation technique is implemented. In accordance with embodiments disclosed herein, quadrature compensation electrodes are added in association with the drive mass. The quadrature compensation electrodes are coupled in reverse polarity with sense electrodes associated with the sense mass. When an angular rate sensor experiences quadrature motion, both the drive mass and the sense mass move together in response to this quadrature motion. By coupling the quadrature compensation electrodes in reverse polarity with the sense electrodes, a quadrature error signal component sensed at the quadrature compensation electrodes due to quadrature motion of the drive mass substantially cancels a quadrature error signal component sensed at the sense mass due to quadrature motion of the sense mass. Consequently, the capacitance output due to quadrature error will be reduced to compensate for the quadrature error. Consequently, compensation for quadrature error is accomplished without using electrostatic force.

An embodiment of an angular rate sensor includes a substrate, a drive mass flexibly coupled to the substrate, and a sense mass suspended above the substrate and flexibly connected to the drive mass via flexible support elements. A first electrode is associated with the drive mass and a second electrode is associated with the sense mass. The second electrode is electrically coupled to the first electrode in reverse polarity so that a first error component between the first electrode and the drive mass substantially cancels a second error component between the second electrode and the sense mass.

An embodiment of method of compensating for quadrature error in an angular rate sensor, where the angular rate sensor includes a drive mass flexibly coupled to a substrate and a sense mass suspended above the substrate and flexibly connected to the drive mass via flexible support elements, includes disposing a compensation electrode proximate the drive mass, disposing a sense electrode proximate the sense mass, and electrically coupling the compensation electrode with the sense electrode in reverse polarity so that a first error component between the compensation electrode and the drive mass substantially cancels a second error component between the sense electrode and the sense mass. According to a further embodiment, wherein the compensation electrode is a first compensation electrode, the sense electrode is a first sense electrode, and the method also includes disposing a second compensation electrode proximate the drive mass, disposing a second sense electrode proximate said sense mass, and electrically coupling the second compensation electrode with the second sense electrode in the reverse polarity so that a third error component between the second compensation electrode and the drive mass substantially cancels a fourth error component between the second sense electrode and the sense mass.

Although the preferred embodiments of the invention have been illustrated and described in detail, it will be readily apparent to those skilled in the art that various modifications may be made therein without departing from the spirit of the invention or from the scope of the appended claims. For example, the drive mass(es) and/or sense mass(es) can have different shapes, such as circular rings, disks, rectangles, and the like. In addition, the drive mass(es) and sense mass(es) may be arranged differently from that which is shown. For example, one sense mass may be centrally located, another sense mass may form an outer frame structure, and the drive mass may be interposed between the two sense masses. Furthermore, although embodiments discussed herein are single axis designs, the same technique may be applied to multi-axis designs as well. In accordance with the embodiments described herein, such variances in structure will still include quadrature compensation electrodes in association with the drive mass(es) and the reverse polarity coupling of the quadrature compensation electrodes with the sense electrodes. Accordingly, it should be appreciated that the exemplary embodiments are only examples, and are not intended to limit the scope, applicability, or configuration of the invention.

What is claimed is:

1. An angular rate sensor comprising:
 a substrate;
 a drive mass flexibly coupled to said substrate, said drive mass including first and second regions separated by an axis of rotation oriented parallel to a surface of said substrate;
 a sense mass suspended above said substrate and flexibly connected to said drive mass via flexible support elements, said sense mass including third and fourth regions separated by said axis of rotation, said first and third regions being laterally disposed on a first side of said axis of rotation, and said second and fourth regions being laterally disposed on a second side of said axis of rotation;
 a first electrode associated with said drive mass and disposed beneath said first region; and a second electrode associated with said sense mass and disposed beneath said fourth region, said second electrode being electrically coupled to said first electrode in reverse polarity so that a first error component between said first electrode and said drive mass substantially cancels a second error component between said second electrode and said sense mass.

2. An angular rate sensor as claimed in claim 1 wherein:
said drive mass together with said sense mass is configured to move with an oscillatory motion relative to a drive axis;
said flexible support elements enable said sense mass to oscillate relative to a sense axis that is perpendicular to said drive axis in response to an angular velocity about an input axis that is perpendicular to each of said drive and said sense axes; and
said drive mass together with said sense mass oscillates relative to said sense axis in response to a quadrature error, said quadrature error producing said first error component at said first electrode and said second error component at said second electrode.

3. An angular rate sensor as claimed in claim 1 wherein:
said first electrode is a quadrature compensation electrode; and
said second electrode is a sense electrode.

4. An angular rate sensor as claimed in claim 1 further comprising a positive output terminal electrically coupled with said second electrode, wherein said second electrode is a positive pole of said angular rate sensor and said first electrode is a negative pole of said angular rate sensor.

5. An angular rate sensor as claimed in claim 4 further comprising:
a third electrode associated with said drive mass;
a fourth electrode associated with said sense mass, said fourth electrode being electrically coupled to said third electrode; and
a negative output terminal electrically coupled with said fourth electrode, wherein said fourth electrode is a negative pole of said angular rate sensor and said third electrode is a positive pole of said angular rate sensor so that a third error component between said drive mass and said third electrode substantially cancels a fourth error component between said sense mass and said fourth electrode.

6. An angular rate sensor as claimed in claim 1 wherein:
said first electrode is fixedly attached to said first region of said drive mass or to said substrate underlying said first region; and
said second electrode is fixedly attached to said fourth region of said sense mass or to said substrate underlying said sense mass.

7. An angular rate sensor as claimed in claim 1 further comprising:
a third electrode associated with said drive mass and disposed beneath said second region; and
a fourth electrode associated with said sense mass and disposed beneath said third region, said third electrode being coupled to said fourth electrode so that a third error component between said drive mass and said third electrode substantially cancels a fourth error component between said sense mass and said fourth electrode.

8. An angular rate sensor as claimed in claim 1 wherein said axis of rotation is a sense axis, and said drive mass together with said sense mass is configured to move with said oscillatory motion about a drive axis that is perpendicular to said surface, and said flexible support elements enable said sense mass to oscillate about said sense axis in response to an angular velocity about an input axis that is perpendicular to each of said sense and drive axes.

* * * * *